US007668614B2

(12) United States Patent
Govind et al.

(10) Patent No.: US 7,668,614 B2
(45) Date of Patent: Feb. 23, 2010

(54) OPTIMIZATION-BASED PROCESS SCHEDULING METHOD AND SYSTEM

(75) Inventors: Nirmal Govind, Chandler, AZ (US); Bala Iyer, Chandler, AZ (US); Charles S. Lockwood, Beaverton, OR (US); James R. Wuerfel, Chandler, AZ (US); Peter J. Lopez, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 416 days.

(21) Appl. No.: 11/239,254

(22) Filed: Sep. 29, 2005

(65) Prior Publication Data
US 2007/0073430 A1    Mar. 29, 2007

(51) Int. Cl.
*G06F 19/00* (2006.01)
*G06F 11/30* (2006.01)

(52) U.S. Cl. .................. 700/100; 700/103; 700/111; 700/121; 702/182; 702/184; 702/179

(58) Field of Classification Search ............ 700/99, 700/100, 103, 111, 121; 702/176, 179, 182, 702/184
See application file for complete search history.

(56) References Cited

U.S. PATENT DOCUMENTS

| 5,841,677 | A  | * | 11/1998 | Yang et al. ............ 702/176 |
| 6,924,879 | B2 | * | 8/2005  | Ikeda .................. 355/53 |
| 6,957,113 | B1 | * | 10/2005 | Logsdon et al. ........ 700/100 |
| 7,043,322 | B1 | * | 5/2006  | Denton et al. .......... 700/100 |
| 2005/0021164 | A1 | * | 1/2005 | Surholt et al. ......... 700/106 |
| 2006/0074522 | A1 | * | 4/2006 | Liang et al. ........... 700/223 |
| 2006/0149404 | A1 | * | 7/2006 | Denton et al. .......... 700/99 |

OTHER PUBLICATIONS

Leachman, Robert C., et al., "SLIM: Short Cycle Time and Low Inventory in Manufacturing at Samsung Electronics", *Interfaces*, vol. 32, Jan.-Feb. 2002, 61-77.

Jain, Vipul, et al., "Algorithms for Hybrid MILP/CP Models for a Class of Optimization Problems", *Informs Journal on Computing*, vol. 13, No. 4, (2001), 258-276.

* cited by examiner

*Primary Examiner*—Paul L Rodriguez
*Assistant Examiner*—Sheela Rao
(74) *Attorney, Agent, or Firm*—Blakely, Sokoloff, Taylor & Zafman LLP (57) ABSTRACT

Embodiments of a method of optimally scheduling, in near real-time, workunits for processing on processing stations in a processing system, while accounting for constraints such as processing station qualifications by workunit type and service type, and to meet certain business objectives such as cycle time and demand targets, are described. A method of scheduling the processing of workunits in a processing system comprises defining a plurality of workunits, aggregating the work units by workunit type and service to be performed on each workunit to define one or more workunit type-service type groupings. The method further allocates capacity of one or more processing stations to workunit type-service type groupings, assigns workunits of the plurality of workunits to meet the allocated capacity, and sequences the workunit type-service type groupings and workunits on each processing station of the one or more processing stations. Other embodiments are described and claimed.

12 Claims, 4 Drawing Sheets

OPTIMIZATION-BASED PROCESS SCHEDULING METHOD AND SYSTEM

FIELD

Embodiments of the invention relate generally to algorithms and methods for scheduling processes, particularly manufacturing processes.

BACKGROUND

Increasing the efficiency of modern manufacturing processes is a complex problem. Typically, a large but finite group of resources, such as machines in a facility, are available to perform operations on materials or groups of materials. In order to cost-effectively produce the most usable items in the shortest time, it is important to keep expensive assets, such as machinery, in useful operation for as much of the time as possible. Scheduling the processing of materials on the machines in a way that optimizes efficiency is therefore an important task. The variables involved in the manufacturing scheduling process include, but are not limited to, the fact that the machines usually have different capabilities and/or functions, and that the materials usually become available in different quantities at different times. Making the manufacturing process more efficient involves solving a complex problem including these multiple variables. In addition, the variables are subject to change at any time. For example, machines may suddenly become unavailable, or material flow may become interrupted.

Figure 1:
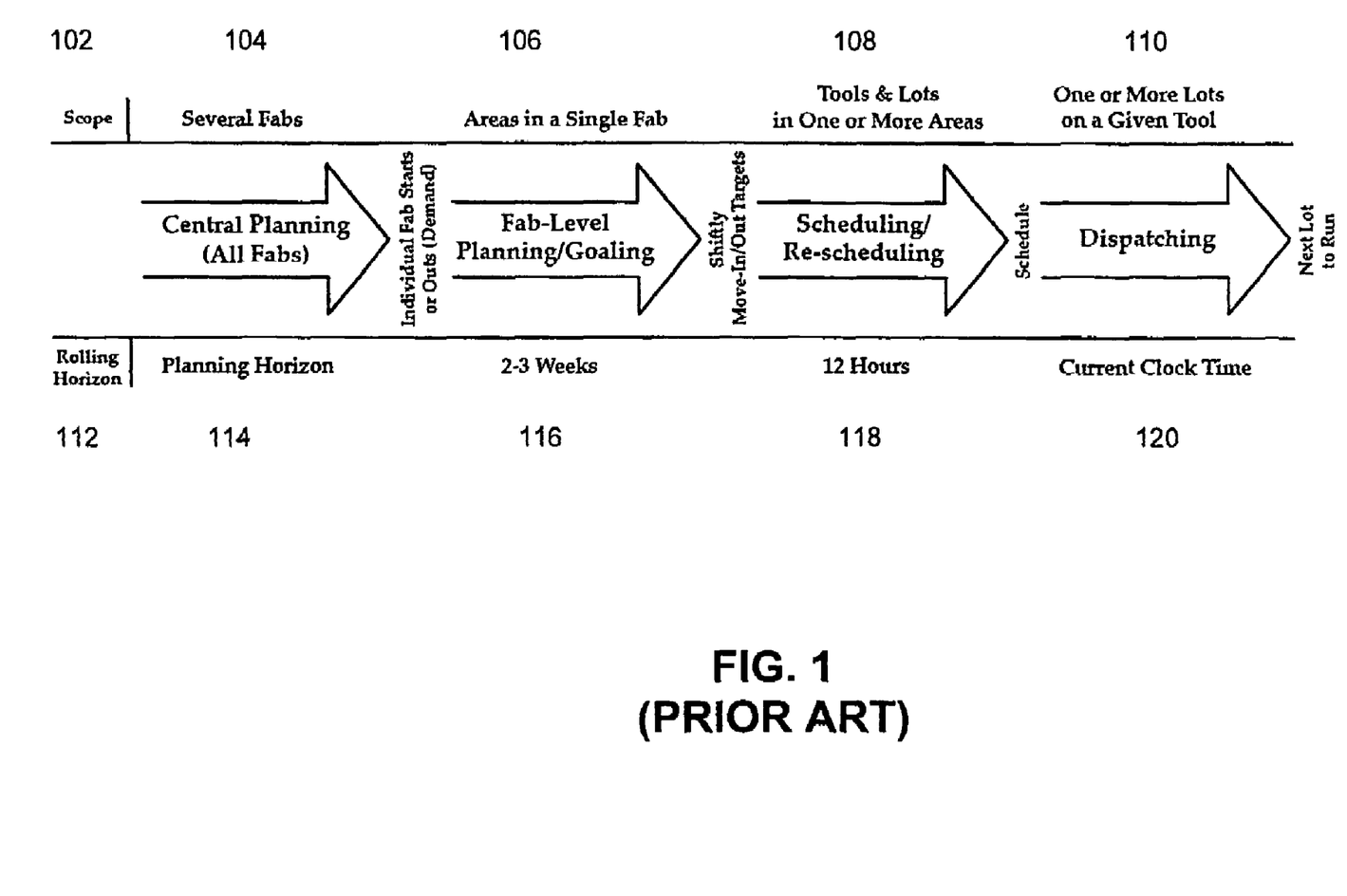
FIG. 1 is a flow diagram that illustrates a prior art process flow in a typical semiconductor manufacturing process.

FIG. 1 is a flow diagram that illustrates a process flow in an existing manufacturing facility. The example illustrated in FIG. 1 is a typical process flow for existing semiconductor wafer fabrication plants. FIG. 1 depicts the scope 102 and horizon 112 for the planning, goaling, scheduling and dispatching problems that occur in typical, known semiconductor manufacturing operations. The scope scale 102 shows the product plan as it progresses from several fabs 104 to areas in a single fab 106 to tools (or "processing stations") and lots (or "workunits") in an area 108 to one or more lots on a given tool 110. As used herein, "fab" indicates a fabrication facility, and also as an alternative term to "fabrication." The rolling horizon 112 progresses from a planning horizon 114, to a time period of weeks 116, to less than one day 118, and then to current clock time 120. During each of these four main scope definitions and event horizons, the planning process progresses from central planning in all fabs (for which the scope is several fabs 104), to fab-level planning and goaling (for which the scope is a single fab 106 and the horizon is weeks 116), to scheduling and re-scheduling (for which the scope is processing stations and workunits in the fab 108 and the horizon is less than one day 118), and then to dispatching (for which the scope is a single processing station 10 and the horizon is current clock time 120). As shown in FIG. 1, the typical method of assigning one or more workunits (e.g. wafers or wafer lots) to a given processing station 110 in real time (current clock time 120) is by dispatching. A majority of semiconductor manufacturers use dispatching to implement heuristic rules that try to circumvent the need for optimal scheduling. In general, dispatching is a real-time solution, primarily due to the narrow scope of the problem. However, it typically does not find an optimal solution. Instead, dispatching is a localized problem solution that looks at each machine individually. Moreover, dispatching typically relies on operator control and the use of common practices, which require human decision-making processes, and thus does not facilitate factory automation.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a near real-time optimization-based scheduling method and system for scheduling processes are described. Various embodiments include a method for scheduling the processing of workunits in a fabrication plant using mathematical optimization, including a decomposition method that takes advantage of the problem structure to find efficient solutions to the scheduling problem. The method determines a particular workunit-to-processing station schedule that specifies the processing station on which each workunit should be processed, and at what time the processing commences. The schedule produced balances the processing workload across the processing stations being considered, while accounting for goals that the fab or fab area needs to meet, reducing the number of setups on processing stations, minimizing the number of long setups, and minimizing movement of auxiliary resources such as interchangeable components. In this manner, the total time spent by workunits in a particular fab area is reduced, and hence the fab cycle time is also reduced. In one embodiment, the method uses a three-stage decomposition based on the problem structure unique to the actual fabrication or manufacturing process. Load balancing is used as a surrogate to cycle time reduction, thus reducing the complexity of the scheduling problem. Optimization is used to solve each of three stages of the decomposition, facilitating optimality at each stage.

In the following description, numerous specific details are introduced to provide a thorough understanding of, and enabling description for, embodiments of the optimization-based production scheduling method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Semiconductor manufacturing is an example of a complex manufacturing process and system in which raw materials are transformed into a finished product through the use of many and various complex and expensive processing stations, each performing different tasks in the process. Some processing stations may be capable of performing more than one task, and each type of processing station may have different rates of processing. Scheduling the processing of workunits through the fab not only requires assigning pre-defined workunits to the processing stations on the line, but also dynamically accommodating exception conditions (triggers) that may occur during processing. Studies have shown that on a typical fab factory floor, the bulk of rescheduling triggers occur within a few minutes of another rescheduling trigger.

Semiconductor processing can generally be divided into four distinct stages: wafer fabrication, electrical die sort, device assembly, and device testing. The time required to produce a semiconductor yield is referred to as "cycle time" and represents the elapsed time from the release of blank silicon wafers until fabrication of devices on those wafers. Typically, the wafer fabrication stage consumes the most cycle time and involves the printing of an electronic circuit pattern on the wafer. Photolithography is the typical process used to transfer a pattern from a photomask (also referred to as a "reticle") onto the surface of the wafer. The pattern on the original reticle plate of the electronic circuit is shrunk, and then exposed on a photoresist-coated wafer. Developing the exposure forms a resist pattern, which is then ready for the etching and doping processes.

Various different machines or tools (processing stations) are used to handle and process the wafers (workunits) during the wafer fabrication stage. An automated track system comprising handling robots is typically used to transfer wafers among a variety of processing stations such as baking/cooling plates, coating and developing units, and a stepper. Each layer of the semiconductor device typically requires a different pattern of devices, and thus a different reticle. For multilayer devices, a number of different process steps may be required to be performed on the same wafer by the various processing stations of the manufacturing process. Scheduling of the workunits with respect to processing by the various processing stations is thus an important factor in reducing cycle time, and maximizing the output of the fab. In general, reducing the cycle time in a fab results in higher revenue, better on-time delivery, and more flexible production lines.

Optimizing the scheduling of workunits in a typical semiconductor fab process is thus a very complex problem. In terms of computational complexity theory, the scheduling problem is typically categorized as NP Hard (Non-deterministic Polynomial-time hard) and cannot be solved in polynomial time. The current state of the art in most semiconductor fabs uses a dispatching model, rather than scheduling, to assign particular workunits to particular processing stations. Dispatching is a localized problem solution in which each processing station is analyzed to determine what it can run next. Dispatching allows solutions to be solved locally (e.g., per processing station), but not necessarily globally for all processing stations in the fab. Furthermore, the dispatching method requires the use of experienced technicians using well-established rules to manually route workunits to particular processing stations.

Apart from traditional dispatching methods, some automated scheduling methods have been developed. Other scheduling solutions include theoretical methods, such as hybrid optimization-constrained programming methods. However, these methods typically attempt to solve far less complex problems, such as a one or two processing station system with few workunits. A typical fab, however, may operate on up to 500 processing stations with upwards of 10,000 workunits in each execution run. In one embodiment, a method of the present invention provides a scheduler that operates on one or more different processing station types that perform like operations, and produces near optimal solutions in near real-time so as to improve on the existing dispatch method typically used to assign workunits to a given processing station in present semiconductor fabs. Such a scheduler is herein referred to as an "optimizing scheduler." The optimizing scheduler, in the context of a semiconductor manufacturing, or similar manufacturing process, dictates when a workunit is processed by a particular processing station given the fact that not all processing stations can run all processes, such that the load of processing workunits is balanced among the processing stations in the system.

A decomposition approach takes advantage of the problem structure to schedule workunits in the fab for a class of processing stations that have layer and product qualifications, for example, backend lithography equipment. Decomposition allows for the process to be broken down into separate components, each of which can be solved using mathematical techniques. This method can be used to transform a virtually unsolvable problem, such as an NP hard problem (such as, for example, a semiconductor manufacturing process) into separate solvable problems. Embodiments of the invention utilize the problem structure inherent in a complex manufacturing process, such as semiconductor fabrication, to define the separate components from which the problem is decomposed.

In one embodiment, the method comprises three optimization routines, which are mixed-integer optimization programs. As mixed-integer programs, some of the decision variables are constrained to have only integer values at the optimal solution, thus expanding the scope of useful optimization problems that can be solved. Besides the three optimization routines, the method utilizes model constraints that specify the physical limitations of the manufacturing process, and model objectives that represent the desired performance of the manufacturing line.

The three optimization routines represent the three "levels" of decomposition of the problem. These levels thus break up the semiconductor manufacturing problem, or any similar problem, into tractable pieces that can be solved using optimization methods. In one embodiment, the first level (Level 1) is capacity allocation to processing stations based on qualification schemes and objectives. In one embodiment, a second level (Level 2) assigns specific workunits to processing stations to match capacity allocation. In one embodiment, a third level (Level 3) sequences workunits to processing stations to meet certain objectives. Each successive level uses the solution from the previous level as input.

Figure 2:
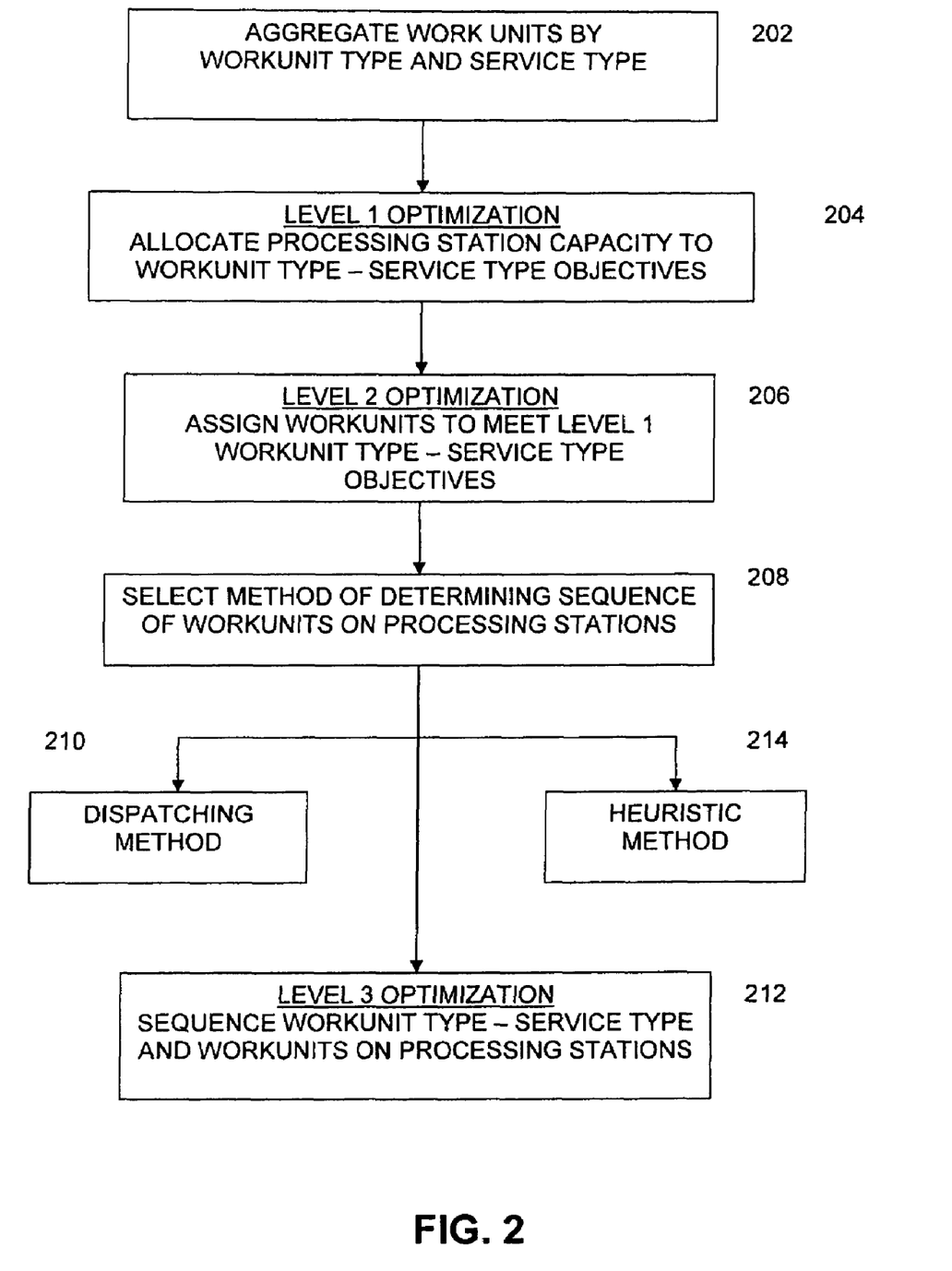
FIG. 2 is a flow chart that illustrates a decomposition method for scheduling workunits processing, according to an embodiment.

FIG. 2 is a flowchart that illustrates an overview of a decomposition method for processing workunits in a process, according to an embodiment. Each workunit is first aggregated by workunit type and service type, 202. A work unit is a unit that is to be worked on, and a workunit type defines a type of workunit. For example, if the workunit is a wafer, one workunit type might be a wafer that is to be processed as a memory device, while another workunit type might be a wafer that is to be processed as a processor device. A service can be an operation, process, or other action taken on the unit to be workunit, and a service type is a type of service. For example, if the workunit is a wafer, one service type might be etching the wafer, and another service type might be polishing the wafer. During the Level 1 optimization process 204, workunits are grouped by workunit type—service type ("W/S") combinations. This reduces the number of scheduling entities. The Level 1 optimization allocates processing station capacity to workunit type—service type objectives, as opposed to assigning particular workunits to a processing station. The Level 1 optimization allocates a particular amount of time or number of workunits of a particular workunit type—service type combination to each particular processing station, and performs this allocation taking objectives and constraints into account. The constraints could include limited processing station use, such as a processing station that can only do some operations but not others. The objective may be one or more metrics, such as a certain output per processing station.

The output of the Level 1 optimization is a capacity allocation that specifies how much processing time for the workunit type—service type is required for each processing station. This output is then used in the Level 2 optimization process 206. This process dictates which particular workunit goes to each processing station and assigns workunits to meet the Level 1 workunit type—service type capacity allocation. Level 1 aggregates the workunits by workunit type—service type, while Level 2 disaggregates the workunit type—service type to obtain particular workunits to go on each processing station.

The next task is to determine the order in which to run the workunits on the processing stations. This is essentially a sequencing operation. Order may be an important factor in optimizing the throughput of the system since the setups for the processing stations may be different depending on the workunit order. In one embodiment, different sequence methods are available and can be used. Therefore, a preliminary operation requires the selection of a method of sequencing the workunits on the processing stations, 208. For the embodiment illustrated in FIG. 2, the dispatching method 210 and the heuristic method 214 are both available as possible methods of performing the sequencing operation.

In one embodiment, the sequencing operation comprises a Level 3 optimization of the entire process based on the workunit type—service type processes of Level 1 and Level 2. For this embodiment, the Level 3 optimization 212 sequences the workunit type—service type and the workunits on the processing stations.

Figure 3:
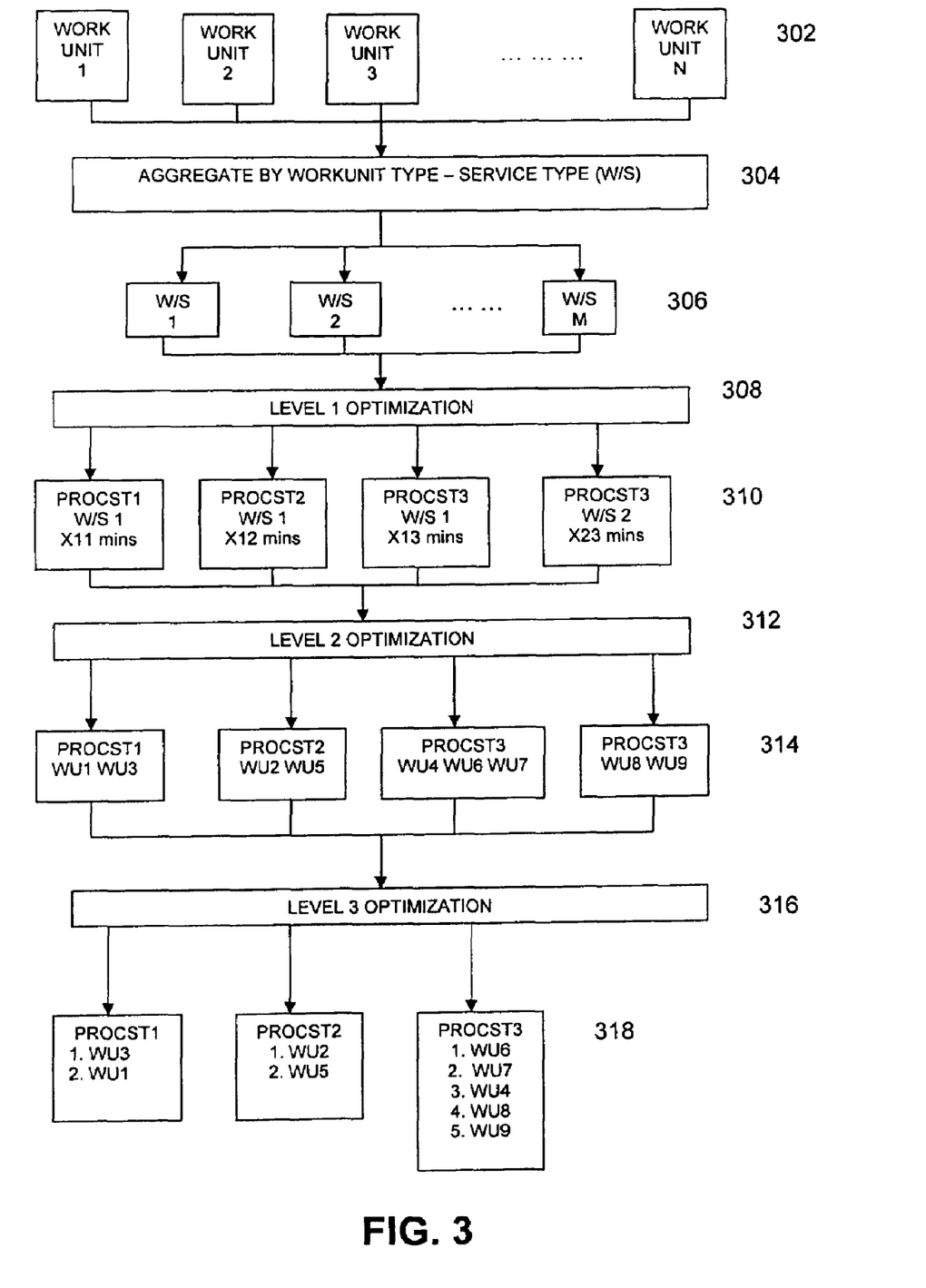
FIG. 3 is a flow diagram of an optimizing scheduler process, according to one embodiment.

FIG. 3 is a flow diagram of an optimizing scheduler process according to an embodiment. FIG. 3 illustrates processes such as illustrated in FIG. 2 in greater detail. As shown in FIG. 3, a number N of workunits (WU) 302 is set to be processed by three different processing stations (PROCST), however, the number of processing stations can vary depending upon the overall system. The workunits are first aggregated by workunit type—service type (W/S) 304. This yields a discrete number M of different workunit type—service type groupings 306.

The Level 1 optimization function 308, in one embodiment, is a capacity allocation operation which groups workunits by W/S combinations. This reduces the number of scheduling entities. The Level 1 optimization 308 allocates processing time on processing stations (also referred to as capacities of processing stations) to W/S combinations, and accounts for W/S-to-processing station qualifications, while accounting for objectives and constraints. In an embodiment, objective functions of the Level 1 optimization 308 include load balancing across processing stations, minimizing the number of setups on processing stations, meeting previously defined goals, and maximizing output from processing stations. The constraints include the following: the allocation should meet a pre-specified W/S-to-processing station qualification scheme, the total processing time on a processing station should not exceed the capacity available; the setup time between W/S changes on a processing station should be accounted for; in-process W/S on a processing station should be allocated so as to avoid an extra setup; the number of parts to be used for processing should be accounted for; parts that already exist on the processing station's library should be used; and long setups should be reduced where possible. These are examples of constraints in the example problem that is used herein for purposes of illustrating embodiments. Constraints are dependent on the problem, and the number of constraints is not otherwise limited.

The output from the Level 1 optimization 308 is a grouping per processing station of the processing time for each W/S 310. This grouping is used by the Level 2 optimization 312 to perform a workunit assignment operation. Thus, for Level 2, the input to Level 2 is output from Level 1, which is W/S-to-processing station capacity allocations. Thus, output from Level 1 optimization equals processing time of $W/S_i$ on $PROCST_j$, for all i, j such that $W/S_i$ is qualified on $PROCST_j$. For the example shown in FIG. 3, for PROCST 1 "X11" denotes the total processing time for W/S 1 on processing station 1. Likewise, for PROCST 3, "X23" denotes the total processing time for W/S 2 on processing station 3.

Specific workunits of each W/S are assigned to processing stations to satisfy allocated processing station-W/S capacities. An objective function of the Level 2 optimization, in an embodiment, is to meet allocated capacities to the extent possible. The constraints include W/S-to-processing station allocations from Level 1. The output from Level 2 is a definition of the workunits to be processed on each processing station (workunit-to-processing station assignment). For the example of FIG. 3, the assignment results in workunits 1 and 3 assigned to processing station 1, workunits 2 and 5 assigned to processing station 2, and so on.

The sequencing operation comprises a Level 3 optimization operation 316. In one embodiment, this is similar to element 212 in FIG. 2. For this operation, the input to Level 3 is the output from Level 2 (which is the assignment of workunits to processing stations). The Level 3 optimization operation 316 sequences W/S batches on the processing stations, where a batch is a set of workunits of the same W/S. It also sequences workunits within each W/S batch. Objective functions of the Level 3 optimization 316 include scheduling larger batches before smaller batches, and scheduling higher priority workunits and/or service types before lower priority ones. The constraints include workunit-to-processing station assignments from Level 2, so that the workunit-to-processing station assignment is maintained. The output of the Level 3 optimization operation 316 is a definition of the position and relative start time of workunits on processing stations. Thus, for the example illustrated in FIG. 3, for processing station 1, workunit 3 is processed first and workunit 1 second, and so on for each processing station, as shown.

The schedule produced by the optimizing scheduler shown in FIG. 3 essentially consists of a sequence of particular workunits assigned to each processing station. This can be provided to the actual factory production processes in a number of different ways. For example, a scheduling chart can be produced and transmitted to personnel responsible for routing workunits to processing stations. Alternatively, a scheduling chart can be produced and used to program a computer or processor that controls an automated or semi-automated assembly line in which workunits are routed to processing stations using robots, or some other mechanism.

Figure 4:
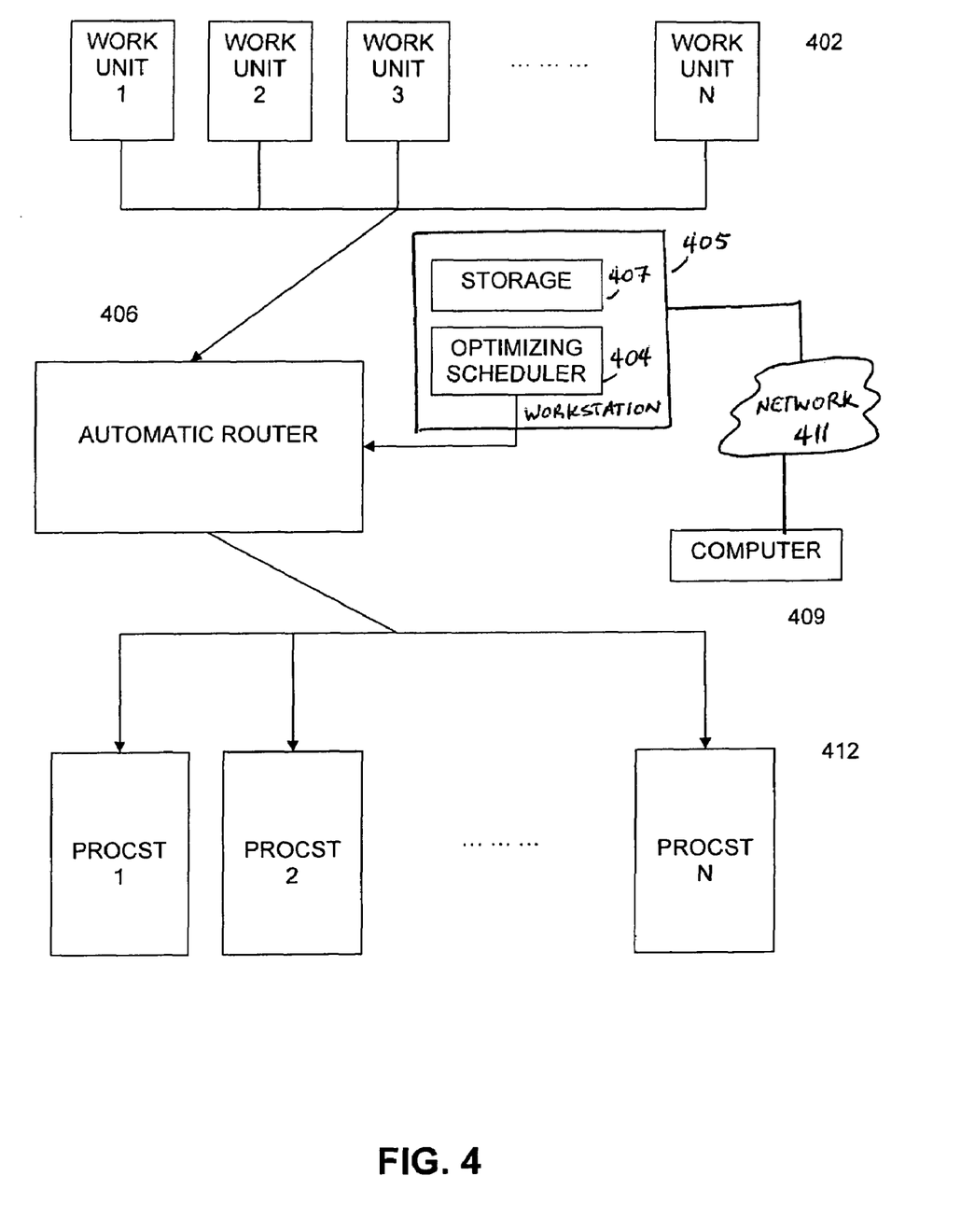
FIG. 4 is a block diagram of a semiconductor fabrication system utilizing an optimizing scheduler, according to an embodiment.

FIG. 4 is a block diagram of a system, such as a semiconductor fabrication system that utilizes an optimizing scheduler, according to an embodiment. A number of workunits 1 to N, denoted 402, are routed to appropriate processing stations (PROCST) 412 by an automatic router 406. The automatic router is controlled by an optimizing scheduler 404. In one embodiment, the optimizing scheduler determines which workunits 402 are assigned to which processing stations 412, and when they are routed to the processing stations in accordance with the load balancing and workunit type—service type methodology described above with respect to FIGS. 2 and 3. In general, the optimizing scheduler 404 dictates when a particular workunit is processed, where it is processed, and which processing station is used to process it in order to balance the workload across all of the processing stations available to perform the process. The optimizing scheduler is generally programmed to balance the workload across the processing stations 412 and optimize throughput by minimizing the number of setups on processing stations and minimizing the movement of auxiliary resources. For the embodiment illustrated in FIG. 4, the optimizing scheduler 404 is a process executed in a computer workstation 405 that also contains storage 407. The computer workstation 405 may be coupled to one or more other computers 409 over a network 411.

The optimizing scheduler 404 also dynamically accommodates exception conditions, such as when a processing station fails or is otherwise no longer available. In this case, the workunits must be reassigned to the remaining processing stations in accordance with the work remaining in the execution run. Exception conditions generate triggers that cause the optimizing scheduler to reschedule the assignment of workunits to processing stations. Other trigger conditions can include disqualification of processing stations from certain tasks, or re-routing of workunits to eliminate or re-execute certain process steps, or to prioritize one workunit in relation to the other workunits. In one embodiment, the optimizing scheduler 404 also implements time-based triggers. Time-based triggers can be set to activate a specific clock times or on a periodic basis, and cause the optimizing scheduler 404 to reschedule the workunit-to-processing station assignment, or to validate a current workunit-to-processing station assignment.

In one embodiment, the optimizing scheduler implements a virtual queue for the processing stations. In a virtual queue, a certain number of workunits that are pending to be processed at a particular workstation are not rescheduled by the scheduler, such as in response to exception conditions or re-routing by the scheduler. The depth of the virtual queue, i.e., the number of workunits that are protected and cannot be rerouted or rescheduled, can be individually programmed for each processing station, or it can be pre-defined for all processing stations or groups of processing stations in the system. In this manner, workunits that are presently in process or immediately pending are not rerouted or rescheduled, thus saving setup time for in-process or soon to be in-process workunits.

The optimizing scheduler, according to embodiments, provides the use of real-time data to achieve near real-time scheduling. The system processes workunits that are already queued up for or presently at a processing station or being acted on by a set of operations. The system also accounts for "upstream" workunits, that is, workunits that are not currently at a processing station, but that are possibly further out in the process and due to be processed at a future time.

The semiconductor fabrication system illustrated in FIG. 4 may be a fab plant such as a 300 mm or 200 mm fab, however, it should be noted that embodiments of the present invention can be used in any type or scale of process, including any complex manufacturing or fabrication processes. Moreover, embodiments of the present invention can be used in any type of manufacturing plant that involves the processing of multiple product workunits on a plurality of processing stations or machines. Although embodiments are described in relation to aggregating workunits by product and operation, the workunits could be aggregated or grouped by any number of different characteristics, such as process time, color, size, or any other such criteria.

A workunit can be any material, product, or group of material or product that is processed by the processing system. An alternative label for workunit is a "service consumer." A processing station can be any type of tool, machine or process that acts on a workunit. An alternative label for processing station is a "service provider." Using these alternative labels, an embodiment, such as that illustrated in FIG. 2 would define consumer type-service type groupings, and aggregate service consumers by consumer type and service required in order to optimize the sequencing of service consumers for the service providers. Although embodiments are described in relation to manufacturing processes involving physical goods or workunits, alternative embodiments can be directed optimizing scheduling in service-based systems that involve providing services from one or more service providers to one or more service consumers, or mixed product/service based systems.

The optimizing scheduler process 404 illustrated in FIG. 4 is typically run on a workstation or similar class computer. For this embodiment, the optimizing scheduler comprises a computer program that is executed on any type of appropriate processor or processing system. The term "processor" as generally used herein refers to any logic processing unit, such as one or more central processing units ("CPU"), digital signal processors ("DSP"), application-specific integrated circuits ("ASIC"), and so on. The processor can be monolithically integrated onto a single chip, distributed among a number of chips or components of a host system, and/or provided by some combination of algorithms.

The optimizing scheduler can be implemented in any combination of microcode, microoperations (microops), software algorithm(s), subroutines, firmware, and hardware running on one or more processors. In software form, the instructions and methods according to embodiments of the invention can be stored on any suitable computer-readable medium, such as microcode stored in a semiconductor chip, on a computer-readable disk, or downloaded from a server and stored locally at the host device, for example.

Aspects of the optimization-based method and system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the optimization-based method and system include: microcontrollers with memory, such as electrically erasable programmable read-only memory ("EEPROM"), embedded microprocessors, firmware, software, etc. Furthermore, aspects of the optimizing scheduler program may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) that may be used to transfer such formatted data and/or instructions through wireless, optical, or wired signaling media or any combination thereof. Examples of transfers of such formatted data and/or instructions include, but are not limited to, transfers (uploads, downloads, e-mail, etc.) over the Internet and/or other computer networks via one or more data transfer protocols, such as hypertext transfer protocol ("HTTP"), file transfer protocol ("FTP"), simple mail transfer protocol ("SMTP"), and so on.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments of the optimization-based method and system is not intended to be exhaustive or to limit the embodiments to the precise methods or systems disclosed. While specific embodiments of, and examples for, the optimizing scheduler are described herein for illustrative purposes, various equivalent modifications are possible within the scope of the optimizing scheduler, as those skilled in the relevant art will recognize.

The elements and acts of the various embodiments described above can be combined to provide further embodiments. These and other changes can be made to the optimizing scheduler in light of the above detailed description.

In general, in the following claims, the terms used should not be construed to limit the optimizing scheduler to the specific embodiments disclosed in the specification and the claims, but should be construed to include all operations or processes that operate under the claims. Accordingly, the optimization-based process scheduling method and system is not limited by the disclosure, but instead the scope of the recited method is to be determined entirely by the claims.

While certain aspects of the optimizing scheduler are presented below in certain claim forms, the inventor contemplates the various aspects of the methodology in any number of claim forms. For example, while only one aspect of the optimizing scheduler is recited as embodied in a machine-readable medium, other aspects may likewise be embodied in a machine-readable medium. Accordingly, the inventors reserve the right to add additional claims after filing the application to pursue such additional claim forms for other aspects of the optimization-based method and system.

What is claimed is:

1. A computer implemented method of scheduling the processing of workunits, comprising:
    defining a plurality of workunits and a plurality of processing stations, each workunit of the plurality of workunits containing one or more items to be serviced by at least one of the plurality of processing stations;
    aggregating, with a processor, the plurality of workunits into a discrete number of workunit type-service type groupings consisting of a workunit type combined with a service type, wherein a service type is a type of service to be performed on each workunit;
    allocating to each processing station a total processing time for each workunit type-service type grouping for which the processing station is qualified based on an optimization of a first objective function which load balances the total processing time across the processing stations and minimizes a number of setups on the processing stations;
    disaggregating the plurality of allocated workunit type-service type groupings by assigning particular workunits to each processing station to achieve the allocated total processing time for each processing station; and
    determining a relative start time for each workunit assigned to each processing station to batch the workunit type-service type groupings on each processing station based on an optimization of a second objective function.

2. The method of claim 1, wherein determining the relative start time comprises one of a sorting method, a heuristic method, and a sequencing algorithm derived from an optimization process.

3. The method of claim 1, wherein a pre-determined number of workunits pending processing at a processing station of the plurality of processing stations is protected from being assigned to a different processing station of the plurality.

4. The method of claim 1, wherein the workunits comprise silicon wafers processed in a semiconductor wafer fabrication plant, and the plurality of processing stations comprise equipment for semiconductor wafer fabrication.

5. The method of claim 1, wherein the first objective function comprises
    maximizing output from the processing stations.

6. The method of claim 5, wherein constraints on the first objective function further include:
    a total processing time on each processing station cannot exceed the capacity available; and
    the setup time at a workunit type-service type grouping change on a processing station is accounted for.

7. The method of claim 5, wherein allocating the capacity of each processing station is initiated by an event-based trigger in response to an exception condition selected from the group consisting of: disqualification of a processing station from certain services, re-routing of a workunit to re-execute certain processing, operational failure of a processing station, and change in prioritization of a workunit relative to the remainder of the plurality.

8. The method of claim 1, wherein the second objective function comprises:
    scheduling each batch of workunit type-service type group to place larger batches before smaller batches; and
    scheduling within each batch of workunit type-service type group higher priority workunits or service types before lower priority workunits or service types.

9. A machine-readable medium including instructions stored thereon which when executed in a processing system, cause the processing system to schedule the processing of workunits by:
    defining a plurality of workunits and a plurality of processing stations, each workunit of the plurality of workunits containing one or more items to be serviced by at least one of the plurality of processing stations;
    aggregating the plurality of workunits into a discrete number of workunit type-service type groupings consisting of a workunit type combined with a service type, wherein a service type is a type of service to be performed on each workunit;

allocating to each processing station a total processing time for each workunit type-service type grouping for which the processing station is qualified based on a constrained optimization of a first objective function which load balances the total processing time across the processing stations and minimizes a number of setups on the processing stations;

disaggregating the plurality of allocated workunit type-service type groupings by assigning particular workunits to each processing station to achieve the allocated total processing time for of each processing station; and determining a relative staff time for each workunit assigned to each processing station to batch the workunit type-service type groupings on each processing station based on an optimization of a second objective function.

10. The storage medium of claim 9 wherein determining the relative start time comprises one of a sorting method, a heuristic method, and a sequencing algorithm derived from an optimization process.

11. A system comprising:

a workunit deposit area configured to store a plurality of workunits for processing; a plurality of processing stations configured to process the workunits stored in the workunit deposit area;

a transport system for routing individual workunits of the plurality of workunits from the workunit deposit area to at least one processing station of the plurality of processing stations; and an optimizing scheduler configured to execute program instructions that cause the routing and processing of the workunits by the processing stations by:

defining a plurality of workunits;

aggregating the plurality of workunits into a discrete number of workunit type-service type groupings consisting of a workunit type combined with a service type, wherein a service type is a type of service to be performed on each workunit;

allocating to each processing station a total processing time for each workunit type-service type grouping for which the processing station is qualified based on an optimization of a first objective function which load balances the total processing time across the processing stations and minimizes a number of setups on the processing stations;

disaggregating the plurality of allocated workunit type-service type groupings by assigning particular workunits to each processing station to achieve the allocated total processing time for of each processing station; and determining a relative start time for each workunit assigned to each processing station to batch the workunit type-service type groupings on each processing station based on an optimization of a second objective function.

12. The system of claim 11, wherein:

the plurality of processing stations comprise equipment for semiconductor wafer fabrication;

the plurality of workunits comprise silicon wafers; and at least one of the plurality of processing stations comprises a photolithography processing station.

* * * * *

UNITED STATES PATENT AND TRADEMARK OFFICE
CERTIFICATE OF CORRECTION

PATENT NO. : 7,668,614 B2 Page 1 of 1
APPLICATION NO. : 11/239254
DATED : February 23, 2010
INVENTOR(S) : Govind et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this

Fourth Day of January, 2011

David J. Kappos
*Director of the United States Patent and Trademark Office*